(12) United States Patent
Kapoor et al.

(10) Patent No.: US 8,776,008 B2
(45) Date of Patent: Jul. 8, 2014

(54) POST FACTO IDENTIFICATION AND PRIORITIZATION OF CAUSES OF BUFFER CONSUMPTION

(75) Inventors: Ajai Kapoor, San Jose, CA (US); Ravi Shankar, San Jose, CA (US); Xiangting Yuan, Pleasanton, CA (US); Anthony H. Hoang, Milpitas, CA (US); Prakash K. Pati, San Jose, CA (US)

(73) Assignee: Realization Technologies, Inc., San Jose, CA (US)

( * ) Notice: Subject to any disclaimer, the term of this patent is extended or adjusted under 35 U.S.C. 154(b) by 695 days.

(21) Appl. No.: 12/610,228

(22) Filed: Oct. 30, 2009

(65) Prior Publication Data

US 2011/0107333 A1    May 5, 2011

(51) Int. Cl.
*G06F 9/44* (2006.01)
*G06Q 10/00* (2012.01)

(52) U.S. Cl.
USPC ......... 717/101; 717/102; 705/7.12; 705/7.22; 705/7.23

(58) Field of Classification Search
USPC .................................. 717/100, 101, 102, 103
See application file for complete search history.

(56) References Cited

U.S. PATENT DOCUMENTS

| | | | |
|---|---|---|---|
| 6,314,446 B1* | 11/2001 | Stiles | 718/100 |
| 7,337,124 B2* | 2/2008 | Corral | 705/7.17 |
| 7,765,105 B2* | 7/2010 | Mo | 705/1.1 |
| 2004/0117231 A1* | 6/2004 | Jochheim et al. | 705/8 |
| 2005/0229151 A1* | 10/2005 | Gupta et al. | 717/101 |
| 2006/0152759 A1* | 7/2006 | Chen et al. | 358/1.15 |
| 2007/0168918 A1* | 7/2007 | Metherall et al. | 717/101 |
| 2008/0114625 A1* | 5/2008 | Kline et al. | 705/7 |
| 2008/0263077 A1* | 10/2008 | Boston | 707/102 |

* cited by examiner

*Primary Examiner* — Charles Swift
(74) *Attorney, Agent, or Firm* — Park, Vaughn, Fleming & Dowler LLP; Laxman Sahasrabuddhe

(57) ABSTRACT

Some embodiments of the present invention provide systems and techniques for collecting task status information. During operation, the system can receive a status update for a task from a task manager through a GUI. Next, the system can determine whether the first status update for the task indicates that the task is delayed. If the status update indicates that the task is delayed, the system can request the task manager to indicate the help needed to resolve the task delay. Next, the system can receive a help needed descriptor from the task manager. Subsequently, the system can receive another status update for the task from the task manager, wherein the status update indicates that the help specified in the help needed descriptor is no longer required. Next, the system can determine an amount of delay associated with the help needed descriptor.

12 Claims, 10 Drawing Sheets

| WINDOW 700 | | | | | |
|---|---|---|---|---|---|
| TASK ID 702 | PR. NAME 704 | TASK DESC. 706 | STATUS 708 | REM. DUR. 710 | HELP NEEDED 712 |
| S1 | SATURN | | CO  v | 3 | NEED RESOURCE |
| S2 | SATURN | | IP  v | 2 | - |
| S3 | SATURN | | NS  v | 4 | NEED MACHINE REP |
| J1 | JUPITER | | NS  v | 2 | NEED FEEDBACK |

WINDOW 800

SELECT HELP NEEDED

[_____v]

[ OK ]  [ CANCEL ]

TABLE 1000

| DAY | STATUS | REMAINING DURATION | HELP NEEDED |
|---|---|---|---|
| 0 | NS | | RES. (R1) |
| 1 | NS | | RES. (R1) |
| 2 | NS | | RES. (R2) |
| 3 | NS | | RES. (R2) |
| 4 | NS | | RES. (R2) |
| 5 | IP | 10 | |
| 6 | IP | 9 | |
| 7 | IP | 8 | |
| 8 | IP | 8 | MAINT. |
| 9 | IP | 7 | MAINT. |
| 10 | IP | 6 | |
| 11 | IP | 2 | |
| 12 | IP | 4 | |
| 13 | IP | 4 | RES. (R1) |
| 14 | IP | 3 | RES. (R1) |
| 15 | IP | 2 | |
| 16 | IP | 1 | |
| 17 | CO | | |

TABLE 1002

| HELP NEEDED | START DELAY | EXEC. DELAY |
|---|---|---|
| RES. | 5 | 1 |
| MAIN. | 0 | 1 |

TABLE 1004

| HELP NEEDED | START DELAY | EXEC. DELAY |
|---|---|---|
| R1 | 2 | 1 |
| R2 | 3 | 0 |

FIG. 10

POST FACTO IDENTIFICATION AND PRIORITIZATION OF CAUSES OF BUFFER CONSUMPTION

TECHNICAL FIELD

The present disclosure generally relates to collection and analysis of project execution information. More specifically, the present disclosure relates to methods and apparatuses for collecting task status updates, and identifying and prioritizing issues which are likely to cause buffer consumption.

BACKGROUND

Related Art

The ability to successfully complete projects on time is critical for any organization's success. Not surprisingly, organizations spend large amounts of resources to ensure that projects are properly planned and executed. Unfortunately, despite all of the resources spent on project planning and execution, very few projects complete on time and are within budget.

In theory, properly planned projects should complete on time. However, in reality, project plans are inherently uncertain because the future is unpredictable. Many problems may arise during the execution of the project, which may cause the project plan to slip. For example, requirements may change, equipment may fail, vendors may not deliver on time, work may materialize more slowly than expected, approvals may not be granted on time, priorities may change, etc.

It is desirable to enable organizations to identify problems during execution, which if fixed, will minimize the impact on the project. Further, it is desirable to enable organizations to identify areas for improvement so that appropriate corrective actions can be taken to improve the efficiency of project execution in the future.

SUMMARY

Some embodiments of the present invention provide systems and techniques for collecting and analyzing task status information. Specifically, in some embodiments, an organization can use the systems and techniques described in this disclosure to perform a post-facto analysis of the completed projects.

Some embodiments determine an aggregate delay associated with a task attribute value. During operation, the system can receive a set of projects, which include completed projects and currently executing projects. Each project can include a project buffer and a set of tasks whose interdependencies are representable (i.e., can be represented) using a task dependency network. Further, each task can be associated with one or more attribute values. An attribute value can generally be the value of any attribute that is associated with a task. For example, task attribute values associated with a task can include a phase that includes the task, the task manager who owns the task, and a resource instance that is assigned to the task.

Next, the system can determine buffer consumption amounts associated with task chains in each project. A task chain can be a sequence of tasks in a project's task dependency network, which ends in the project buffer. Note that each project ends with a project buffer that is placed at the end of the project to accommodate any delays that may occur during project execution. Note that a task chain includes completed tasks, currently executing tasks, and tasks that have not started. The buffer consumption amount associated with a task chain is the amount of the project buffer that would have been consumed if the tasks in the task chain were the only tasks in the project.

Specifically, the system can determine the buffer consumption amount associated with a task chain as follows. First, the system can determine a task chain's cycle time by aggregating the task execution times and the task starting delays of tasks in the task chain. Next, the system can determine the task chain's end time using the task chain's start time and the task chain's cycle time. Note that a task chain's start time is the task start time of the earliest task in the task chain. Finally, the system can use the task chain's end time to determine the amount of the project buffer that the task chain would have consumed if the tasks in the task chain were the only tasks in the project. Note that, for tasks that have not started, the system can use the planned execution times. For completed tasks, the system can use the actual execution times. Finally, for a task that is currently executing, the system can use the expected execution time as reported by the task manager who owns the task.

Next, the system can select a set of task chains based at least on the buffer consumption amounts. Specifically, the system can order the task chains in decreasing order of their buffer consumption amounts to obtain an ordered sequence of task chains. In other words, the first task chain in the sequence of task chains has the maximum buffer consumption amount, and subsequent task chains have progressively smaller buffer consumption amounts. If two or more task chains have the same buffer consumption amount, their positions relative to one another in the sequence can be randomly determined, or can be determined based on other factors, e.g., the names of the task chains, or the number of tasks in the task chains, etc. The system can then select a prefix of the ordered sequence of task chains, i.e., the system can select the first N task chains in the sequence, where N can be a predetermined value or a user-specified input.

Alternatively, the system can select a set of task chains by determining task chains whose buffer consumption amounts are within a range of the maximum buffer consumption amount. Specifically, the system can first determine the maximum buffer consumption amount. Next, the system can select task chains whose buffer consumption amount is within a range of the maximum buffer consumption amount. Note that the range can be specified as a percentage of the maximum buffer consumption amount.

In some embodiments, the system can select a set of task chains by combining the above-described techniques. For example, the system can select the smaller of the following two sets of task chains: a set of task chains whose buffer consumption amount is within a range of the maximum buffer consumption amount, or a set of the first N task chains in the ordered sequence of task chains.

Once the set of tasks chains has been selected, the system can aggregate task delays for tasks in the set of task chains that are associated with the task attribute value. For example, if task T1 in project P1 and task T2 in project P2 are owned by task manager M1, then the aggregate delay associated with task manager M1 may be equal to the sum of the task delays for task T1 and T2. Note that the system can keep track of different types of delays, e.g., starting delays and execution delays. Note that a starting delay for a resource can also be referred to the queue delay for the resource. Further, the system can associate portions of a task delay value with different task attributes. For example, the total delay for a task may be 10 days, of which 4 days may be due to the unavailability of resource R1 and the remaining 6 days may be due to the unavailability of resource R2. In this scenario, the system can associate a 4 day delay with resource R1 and a 6 day delay with resource R2.

The system can then present the aggregate task delays associated with the task attribute values to a user. For example, the system can present the aggregate task delays for task managers M1, M2, ..., Mk to a user. Further, the system can present a list of tasks and their respective task delays in response to receiving a drill down request from the user. For example, if the user requests a drill down on task manager M1, the system can present tasks T1 and T2 and their respective task delays to the user.

The aggregate task delay can enable the user to identify the task attribute values which are likely to cause project delays. In some embodiments, the system can order the task attribute values in decreasing order of their aggregate task delays. The top task attribute values in this ordering may represent the task attributes that are most likely to cause project delays. These task attribute values are likely candidates for corrective actions that can be taken during project execution and also for post-facto analysis. For example, if the aggregate task delay indicates that projects are being delayed due to a shortage of particular resources, the organization can provide additional resources to correct the problem. Alternatively, after project completion, an analysis of the aggregate task delays can identify task managers who were associated with project delays.

Some embodiments of the present invention provide systems and techniques for collecting task status information. During operation, the system can receive a status update for a task from a task manager through a GUI. Next, the system can determine whether the first status update for the task indicates that the task is delayed. If the status update indicates that the task is delayed, the system can request the task manager to indicate the help needed to resolve the task delay. Next, the system can receive a help needed descriptor from the task manager. Subsequently, the system can receive another status update for the task from the task manager, wherein the status update indicates that the help specified in the help needed descriptor is no longer required. The system can use the two status updates to determine a help needed duration value for which the help specified in the help needed descriptor was needed. Next, the system can determine an amount of delay associated with the help needed descriptor. The system can then store the association between the task, and the amount of delay, and the help needed descriptor in a database. The status information collected using these systems and techniques can then be used for identifying and prioritizing causes for buffer consumption.

BRIEF DESCRIPTION OF THE FIGURES

FIG. 10 illustrates how the status update information can be used to compute delays and to associate the computed delays with different help needed items in accordance with an embodiment of the present invention.

DETAILED DESCRIPTION

The following description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data, so that when a computer system executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

Figure 1:
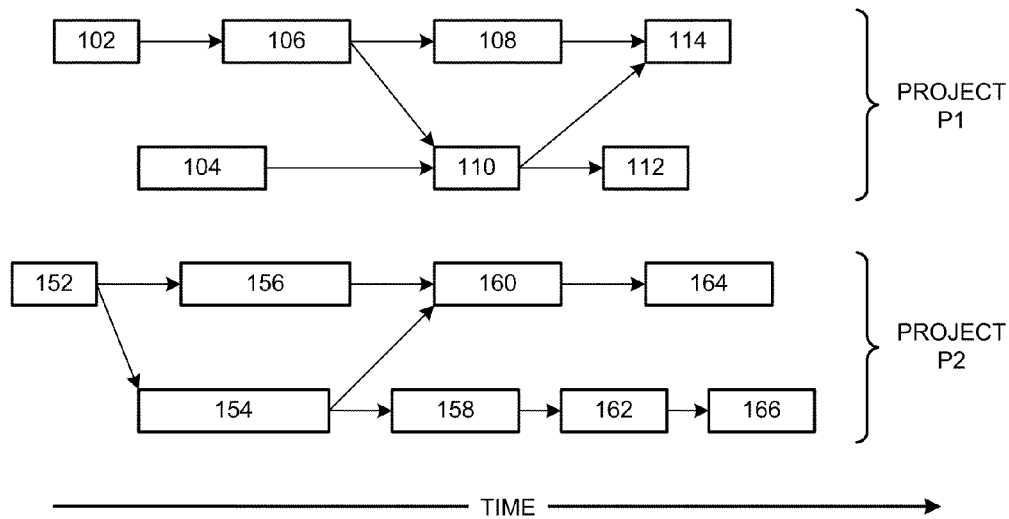
FIG. 1 illustrates multiple projects in accordance with an embodiment of the present invention.

FIG. 1 illustrates multiple projects in accordance with an embodiment of the present invention.

A project can generally be defined as a temporally bounded endeavor which is designed to achieve specific goals and objectives. A project is usually associated with a due date, i.e., a date by which a project needs to be completed. In some cases, the project must be completed on the due date, i.e., completing the project before the due date is not allowed. In other cases, the due date is an "on or before" due date, i.e., project is allowed to be completed on the due date or before the due date. A project can be represented as a set of interdependent tasks. A task can generally be defined as a unit of work which needs to be performed within a specific time period. A task is usually associated with an owner, a set of resources that the task is expected to use, and a start time and an end time.

An organization typically needs to schedule multiple projects at any given time. For example, as shown in FIG. 1, an organization may have projects P1 and P2. Project P1 can include multiple tasks, such as tasks 102-114. Similarly, project P2 can also include multiple tasks, such as tasks 152-166. Note that the horizontal axis in FIG. 1 denotes time.

Each task in FIG. 1 is represented as a rectangle, where the left edge of the rectangle is associated with the task's start time, and the right edge of the rectangle is associated with the task's end time. The tasks can have interdependencies which can be represented using a task dependency network as shown in FIG. 1. A directed edge from task 102 to task 104 indicates that task 104 can be started only after task 102 has completed. Similarly, task 110 can be started only after tasks 104 and 106 have been completed because there are two directed edges from tasks 104 and 106 that are incident on task 110. Likewise, project P2's task dependency network shows that task 160 can be started only after tasks 156 and 154 have completed.

Figure 2:
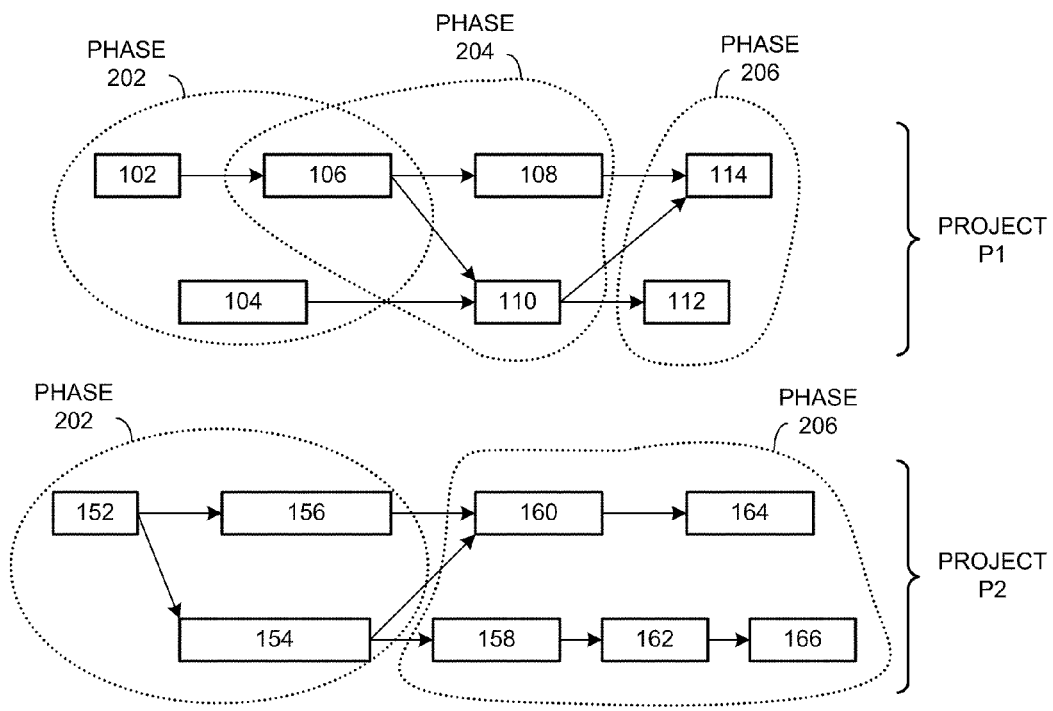
FIG. 2 illustrates how tasks can be associated with phases in accordance with an embodiment of the present invention.

FIG. 2 illustrates how tasks can be associated with phases in accordance with an embodiment of the present invention.

In general, a phase can be an arbitrary collection of tasks, and a task can be associated with one or more phases. Phase 202 includes tasks 102, 104, and 106. In other words, tasks 102, 104, and 106 are associated with phase 202. Similarly, phase 204 includes tasks 106, 108, and 110, and phase 206 includes tasks 112 and 114. Note that since the association between tasks and phases is arbitrary, two phases can share the same task. For example, phases 202 and 204 both include task 106. Tasks from different projects can be associated with the same phase. For example, tasks 102, 104, and 106 in project P1, and tasks 152, 154, and 156 in project P2, are associated with phase 202. Different projects may include different sets of phases. For example, project P1 includes phases 202, 204, and 206. However, project P2 includes phases 202 and 206, but does not include phase 204.

Figure 3:
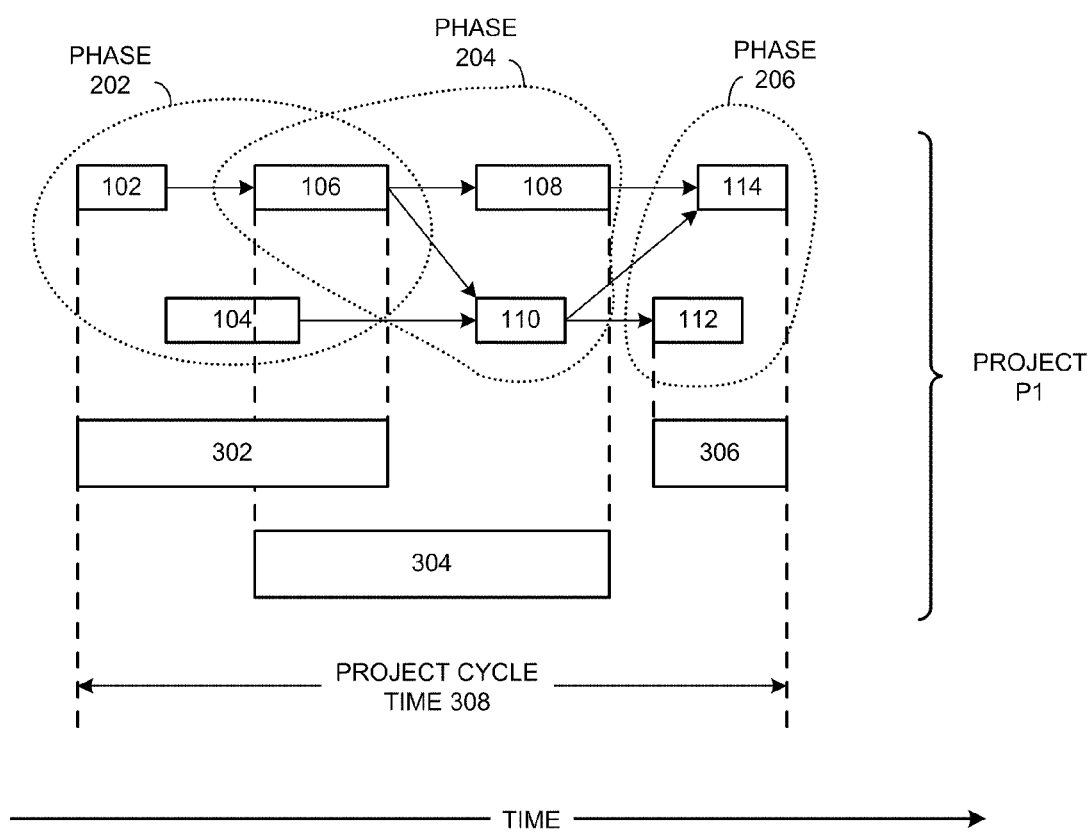
FIG. 3 illustrates how a project can be represented using phases in accordance with an embodiment of the present invention.

FIG. 3 illustrates how a project can be represented using phases in accordance with an embodiment of the present invention.

Once tasks have been associated with phases, a project can be represented in terms of phases. For example, project P1 can be represented as a collection of phases 202, 204, and 206. Each phase can be illustrated as a rectangle, where the left edge of the phase denotes the start time of the phase, and the right edge denotes the end time of the phase. For example, rectangles 302, 304, and 306 can be used to visually represent phases 202, 204, and 206, respectively. The system may also represent interdependencies between phases using directed edges.

A project's cycle time is defined as the duration for which the project is active. Specifically, the project's cycle time is equal to the time interval between the earliest task start time and the latest task end time in the project. For example, as shown in FIG. 3, project cycle time 308 for project P1 is equal to the time interval from task 102's start time to task 114's end time.

Figure 4:
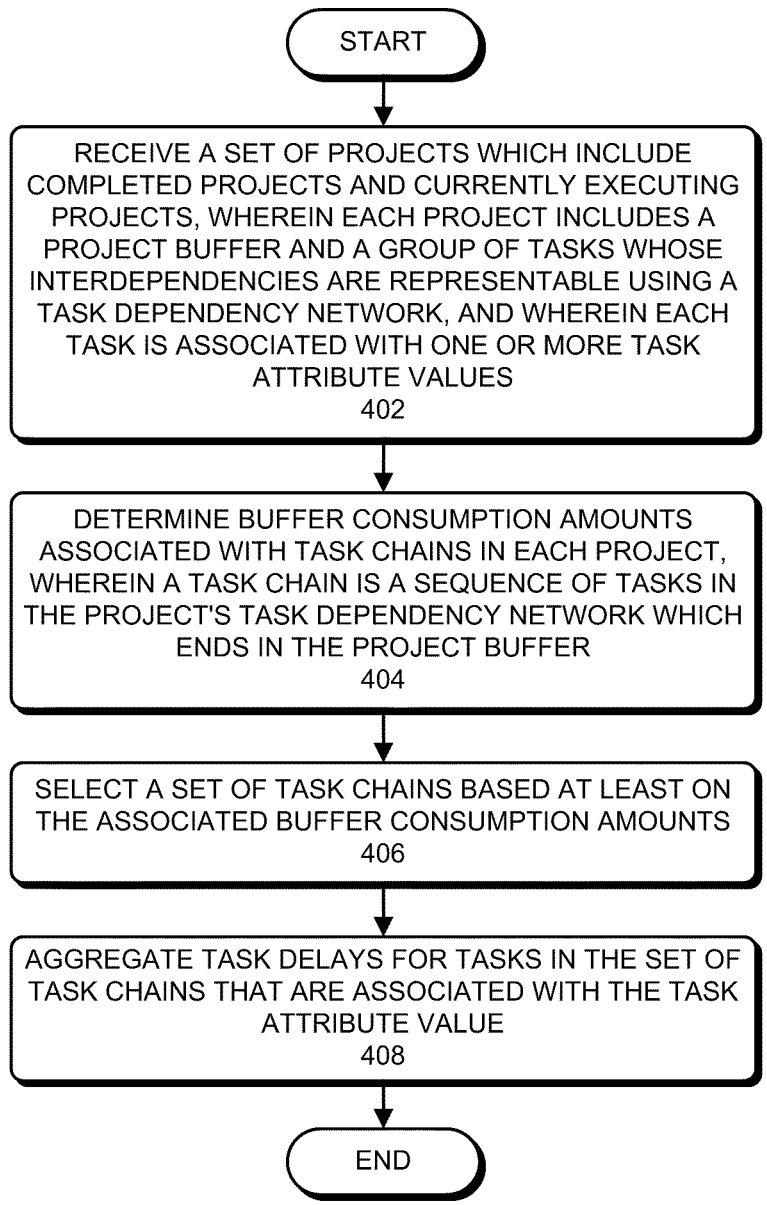
FIG. 4 illustrates a process for determining an aggregate delay for a task attribute value in accordance with an embodiment of the present invention.

FIG. 4 illustrates a process for determining an aggregate delay associated with a task attribute value in accordance with an embodiment of the present invention.

The process can begin by receiving a set of projects which include completed projects and currently executing projects, wherein each project includes a project buffer and a group of tasks whose interdependencies are representable using a task dependency network, and wherein each task is associated with one or more task attribute values (block 402).

Note that the term "receive" is used in this disclosure to refer to an operation that makes specific information available to the system. For example, the system may receive the set of projects when a user provides a file name to the system which contains a description of the set of projects. Alternatively, the system may receive the set of projects when the system receives a sequence of network packets which describe the set of projects.

A task attribute value can generally be the value of any task attribute that is associated with a task. For example, task attribute values associated with a task can include a phase that includes the task, the task manager who owns the task, and a resource (e.g., a skill or machinery) that is assigned to the task, the task description for the task, and a "help needed" item that the task manager specified to resolve an issue with the task.

Next, the system can determine buffer consumption amounts associated with task chains in each project, wherein a task chain is a sequence of tasks in the project's task dependency network which ends in the project buffer (block 404). Note that a task chain includes completed tasks, currently executing tasks, and tasks that have not started. The buffer consumption amount associated with a task chain is the amount of the project buffer that would have been consumed if the tasks in the task chain were the only tasks in the project.

Specifically, the system can determine the buffer consumption amount associated with a task chain as follows. First, the system can determine a task chain's cycle time by aggregating the execution times and the starting delays of tasks in the task chain. Next, the system can determine the task chain's end time using the task chain's start time and the task chain's cycle time. Finally, the system can use the task chain's end time to determine the amount of the project buffer that the task chain would have consumed if the tasks in the task chain were the only tasks in the project. Note that, for tasks that have not started, the system can use the planned execution times. For completed tasks, the system can use the actual execution times. Finally, for a task that is currently executing, the system can use the expected execution time as reported by the task manager who owns the task.

The system can then select a set of task chains based at least on the associated buffer consumption amounts (block 406). Specifically, the system can order the task chains in decreasing order of their buffer consumption amounts to obtain an ordered sequence of task chains. In other words, the first task chain in the task chain sequence has the maximum buffer consumption amount, and subsequent task chains have progressively smaller buffer consumption amounts. If two or more task chains have the same buffer consumption amount, their positions relative to one another in the sequence can be randomly determined, or can be determined based on other factors, e.g., the names of the task chains, or the number of tasks in each of the task chains, etc. The system can then select a prefix of the ordered sequence of task chains, i.e., the system can select the first N task chains in the sequence, where N can be a predetermined value or a user input.

Alternatively, the system can select a set of task chains by determining task chains whose buffer consumption amounts are within a range of the maximum buffer consumption amount. Specifically, the system can first determine the maximum buffer consumption amount. Next, the system can select task chains whose buffer consumption amount is within a range of the maximum buffer consumption amount. Note that the range can be specified as a percentage of the maximum buffer consumption amount.

In some embodiments, the system can select a set of task chains by combining the above-described techniques. For example, the system can select a set of task chains whose buffer consumption amount is within a range of the maximum buffer consumption amount, or the first N task chains in the ordered sequence of task chains, whichever is smaller.

Next, the system can aggregate task delays for tasks in the set of task chains that are associated with the task attribute value (block 408). The system can then present the task attribute value and the aggregate task delay associated with the task attribute value to a user. Further, the system can present a list of tasks and their respective task delays in response to receiving a drill down request from the user.

The aggregate task delay information can enable the user to identify the task attribute values which are likely to cause project delays. These task attribute values are likely candidates for any corrective actions that need to be taken to improve the health of the projects. For example, once the system identifies the task managers who are likely to cause project delays, further investigations can be focused on these project managers. In some embodiments, the system can order the task attribute values in decreasing order of their aggregate task delays. The top task attribute values in this ordering may represent the task attributes that are most likely to cause project delays.

Figure 5A:
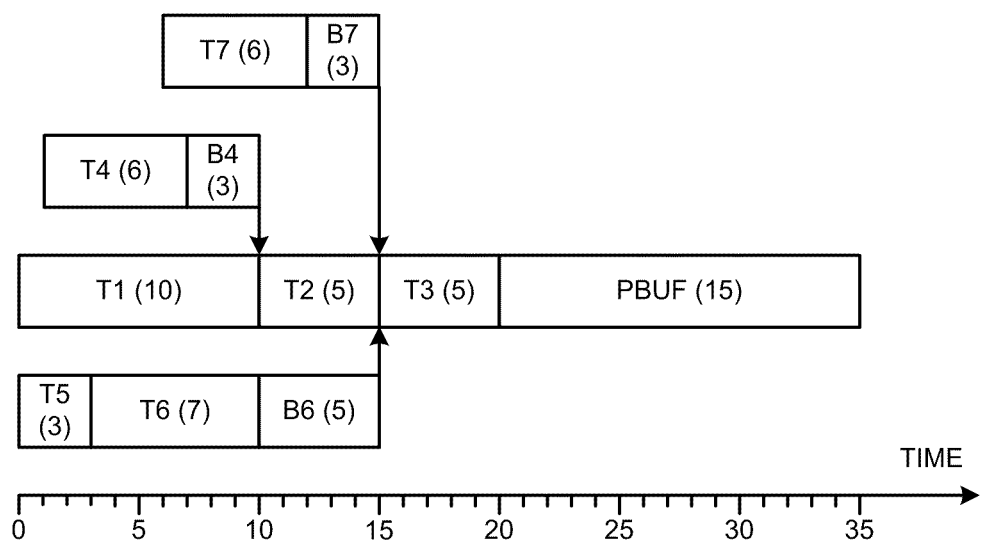
FIGS. 5A and 5B illustrate how buffer consumptions can be determined for task chains in accordance with an embodiment of the present invention.
Figure 5B:
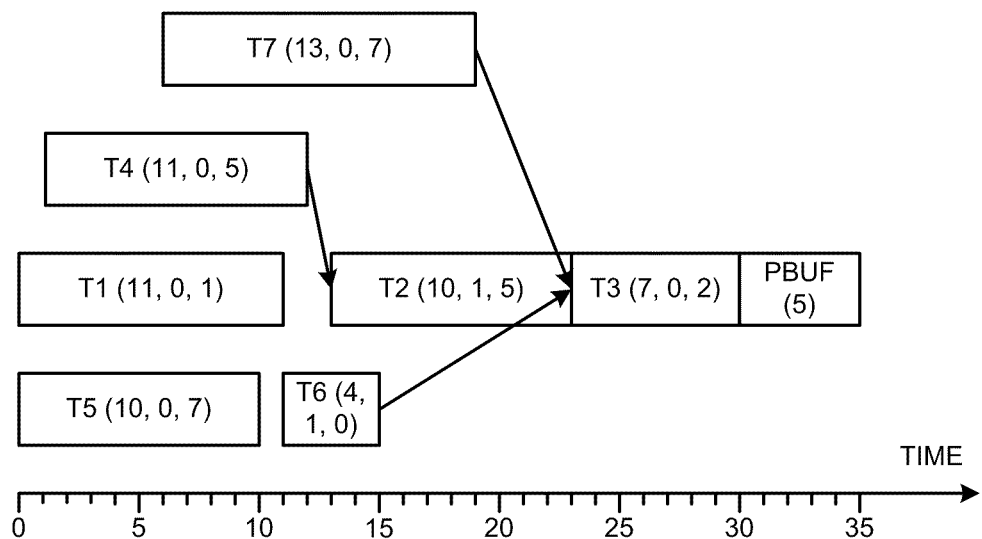

FIGS. 5A and 5B illustrate how buffer consumptions can be determined for task chains in accordance with an embodiment of the present invention. Specifically, FIG. 5A illustrates a task dependency network for a project. The values in the brackets indicate the durations the tasks are expected to execute or the sizes of the buffers. For ease of discourse we will assume that all time amounts shown in FIG. 5A are in days.

Tasks T1, T2, T3, T4, T5, T6, and T7 are expected to take 10, 5, 5, 6, 3, 7, and 6 days, respectively, to complete. Feeding buffers B4, B6, and B7 have been added after tasks T4, T6, and T7, respectively, to accommodate any unanticipated delays during execution. Note that the feeding buffers B4, B6, and B7 are 3, 5, and 3 days long, respectively. Finally, the entire project has a project buffer (PBUF) which is 15 days in length. (Note that the project buffer is typically 50% of the longest task chain. In this case, that would mean that the project buffer should be 10 days long. However, for ease of discourse, a slightly longer project buffer—15 days instead of 10 days—has been assumed in this example.)

The arrows in FIG. 5A indicate the interdependencies among the tasks. Specifically, task T2 can only be started after task T4 has completed. Further task T3 can only be started after tasks T6 and T7 have completed. If a task is adjacent to another task, that also indicates an interdependency. For example, task T3 can only be started after task T2 has completed, which in turn, can only be started after task T1 has completed.

FIG. 5B illustrates the amount of time each task actually took to complete when the project was executed. Note that the entire 10 day project buffer was utilized due to unanticipated delays during execution. Specifically, tasks T1, T2, T3, T4, T5, T6, and T7 actually took 11, 10, 7, 11, 10, 4, and 13 days, respectively, to complete. The three numbers in the brackets are the total execution duration, the starting delay, and the execution delay, respectively. For example, task T1 took a total of 11 days to complete. The starting delay for task T1 was 0 days, and the execution delay was 1 day. Similarly, task T2 took a total of 10 days to complete. The starting delay for task T2 was 1 day, and the execution delay was 5 days.

Note that since 10 days in the project buffer were consumed, the remaining 5 days are shown in project buffer PBUF in FIG. 5B. The system can identify four task chains in the task dependency network illustrated in FIG. 5B by working backwards from project buffer PBUF. Specifically, the first task chain (C1) includes task T3 and T7. The second task chain (C2) includes tasks T3, T2, and T4. The third task chain (C3) includes tasks T3, T2, and T1. Finally, the fourth task chain (C4) includes tasks T3, T6, and T5.

Next, the system can determine the buffer consumptions associated with the task chains. The buffer consumption associated with a task chain is the amount of the project buffer that would have been consumed if the tasks in the task chain were the only tasks in the project. In other words, the buffer consumption for a task chain is the answer to the following question: if we were to look at a particular task chain in isolation, how much of the project buffer would it consume?

Specifically, the system can determine the buffer consumption associated with a task chain by first determining a task chain's end time by aggregating the task execution times and the task starting delays along the task chain, and then using the task chain's end time to determine the amount of the project buffer that the task chain would have consumed.

For example, the buffer consumption for task chain C1 is equal to 6 days because task T7 started on day 6, took 13 days to complete, and if task T3 had started immediately after T7 was completed, task chain C1 would have completed on day 26, thereby consuming 6 days of the project buffer. Note that task T3 did not have any starting delays; hence, in this case, we only needed to aggregate the task execution times to determine the buffer consumption.

The buffer consumption for task chain C4 is equal to 2 days which can be determined as follows. Task T5 started on day 0, took 10 days to complete. Next, task T6 had a starting delay of 1 day, and then took 4 days to complete. Finally, if task T3 had started immediately after the completion of task T6, task T3 would have added another 7 days to the task chain, which would have caused task chain C4 to end on day 22, thereby consuming 2 days of the project buffer.

Similarly, the buffer consumption for task chain C2 is 10 days, which can be computed as follows. The sum of the task execution times and starting delays along task chain C2 is equal to 29 days. However, since task chain C2 starts on day 1 (because task T4 starts on day 1), task chain C2's end time is day 30. Hence, the buffer consumption is 10 days.

Finally, the buffer consumption for task chain C3 is 9 days, and can be computed as follows. The sum of the task execution times and starting delays along task chain C3 is equal to 29. Unlike task chain C2, task chain C3 starts on day 0. Hence, the task chain C3's end time is day 29, and therefore, the buffer consumption is 9 days.

Once the buffer consumption amounts associated with the task chains are determined, the system can then use the buffer consumption amounts to select task chains. For example, the system can select the task chains whose buffer consumption is within 10% of the maximum buffer consumption amount. For example, in FIG. 5B, task chain C2 has the maximum buffer consumption amount, which is equal to 10 days. In this example, the system will select only those task chains whose buffer consumption amounts are greater than or equal to 9 days (i.e., which are within 10% of 10 days). In other words, in this example, the system will select task chains C2 and C3 for computing the aggregate delay associated with the task attribute value.

Note that task T5 was planned to take 3 days, but ended up taking 10 days. However, since task T5 is not in task chains C2 or C3, task T5's delay will not be considered for identifying the task attribute values that are most likely to cause project delay.

Next, the system can determine the aggregate delay associated with a task attribute value by aggregating task delays in the selected task chains that are associated with the task attribute value. For example, suppose tasks T1 and T4 are associated with phase Φ1 (which is a task attribute value), and tasks T2 and T3 are associated with phase Φ2 (which is another task attribute value). Then, the system can associate an aggregate delay of 6 days with phase Φ1 because task T1 has a delay of 1 day, and task T4 has a delay of 5 days. Similarly, the system can associate an aggregate delay of 8 days with phase Φ2 because task T2 has a delay of 6 days, and task T3 has a delay of 2 days.

In some embodiments, the system can separately keep track of the start delays and the execution delays. For example, task T2 has a start delay of 1 day and an execution delay of 5 days. Hence, instead of associating phase Φ2 with an aggregate delay of 8 days, the system can associate phase Φ2 with an aggregate start delay of 1 day and an aggregate execution delay of 7 days. Note that keeping track of start delay and execution delay can provide important insights in to the causes of project delays. For example, if the analysis indicates that the start delay is due to resources, it would indicate a resource shortage. On the other hand if the start delay is due to "material unavailability," it would indicate that the full-kit process for the associated phase needs to be improved so that materials are available on time.

Note that embodiments of the present invention do not simply select tasks based on the task delays. For example, tasks T5 and T7 have the largest delays (7 days), but neither of them was selected because these two tasks belong to task chains that are not associated with high buffer consumption amounts.

There are at least two reasons why a large delay in a task does not translate into a large buffer consumption amount. First, feeding buffers (e.g., buffers B6 and B7) may absorb a portion of the delay. Second, subsequent tasks that complete in less time than planned may absorb a portion of the delay (e.g., task T6 completed in 4 days instead of the scheduled 7 days).

Furthermore, as the project executes, the task chain associated with the maximum buffer consumption may change. In other words, during the beginning of the project, one task chain may be associated with the maximum buffer consumption amount, but as time progresses, a different task chain may become the task chain with the maximum buffer consumption amount.

Figure 5C:
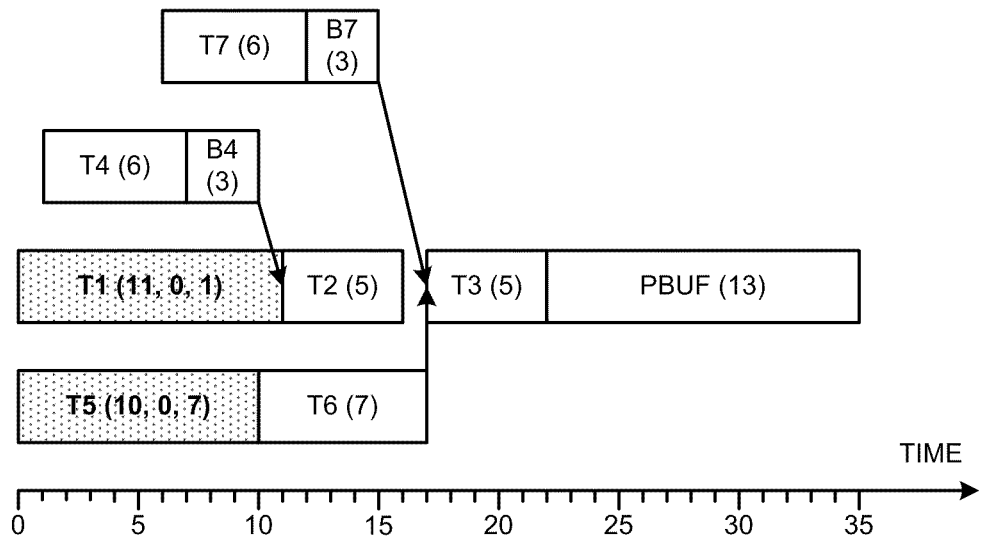
FIGS. 5C and 5D illustrate how the maximum buffer consumption may be associated with different task chains at different times in accordance with an embodiment of the present invention.
Figure 5D:
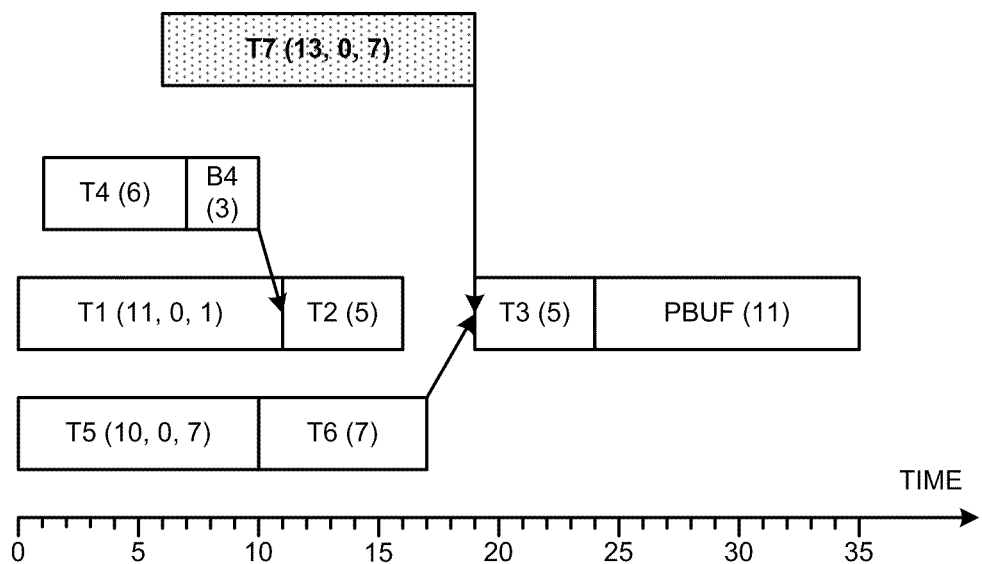

FIGS. 5C and 5D illustrate how the maximum buffer consumption may be associated with different task chains at different times in accordance with an embodiment of the present invention.

Suppose that, at the end of day 0, the task managers for tasks T1 and T5 indicate that task T1 and T5 are going to be delayed and are expected to complete in 11 days and 10 days, respectively. As shown in FIG. 5C, the buffer consumption amounts at the end of day 0 for task chains C1, C2, C3, and C4 are 0, 0, 1, and 2, respectively. Hence, the task chain with the maximum buffer consumption at the end of day 0 is C4.

Next, suppose that, at the end of day 6, the task manager for task T7 indicates that the task is delayed and is expected to complete in 13 days. As shown in FIG. 5D, the buffer consumption amounts at the end of day 6 for task chains C1, C2, C3, and C4 are 4, 0, 1, and 2, respectively. Hence, the task chain with the maximum buffer consumption at the end of day 6 is C1. Finally, as shown in FIG. 5B, the task chain with the maximum buffer consumption at project completion is C2.

Note that, because the system uses the buffer consumption amounts to select the task chains, the system may select different sets of task chains (and therefore different sets of tasks) for analysis depending on the current state of the project. Specifically, computing the buffer consumptions for the task chains allows the system to focus on the task chains that are currently having the most impact on the project buffer.

Figures 6, 7, 8:
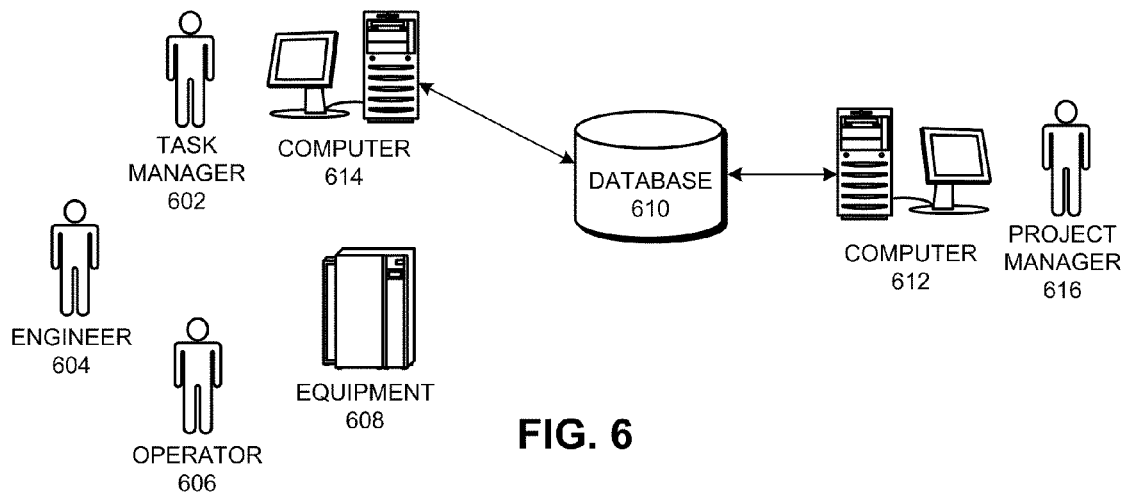
FIG. 6 illustrates a system for monitoring project execution in accordance with an embodiment of the present invention.
FIG. 7 illustrates a window in a graphical user interface (GUI) that a task manager can use to update the status of a task in accordance with an embodiment of the present invention.
FIG. 8 illustrates a window in a GUI for inputting the help need to resolve the task delay in accordance with an embodiment of the present invention.

FIG. 6 illustrates a system for monitoring project execution in accordance with an embodiment of the present invention.

Task manager 602 may own a task which requires multiple resources, such as engineer 604, operator 606, and equipment 608. Task manager 602 may periodically, e.g., every day, update the status of one or more tasks. Specifically, task manager 602 can update the status of a task using a GUI in computer 614. Computer 614 can store the status updates in database 610. Subsequently, another user, e.g., project manager 616, can determine the health of the project by analyzing the status update information stored in database 610. For example, project manager 616 can use computer 612 to determine buffer consumptions for task chains using the status update information stored in database 610.

In some embodiments, the system can perform post-facto analysis on the status update information stored in database 610 by using status update information that relates to completed projects. Specifically, the post-facto analysis can identify and prioritize the causes for delays that occurred in completed projects. In a variation, the system can perform post-facto analysis as each project completes, so that the organization has an up-to-date picture of the issues (resource shortage, process inefficiencies, etc.) that are likely to cause project delays.

FIG. 7 illustrates a window in a GUI that a task manager can use to update the status of a task in accordance with an embodiment of the present invention.

Window 700 may be presented to task manager 602 through a GUI on computer 614. Window 700 can include various GUI objects to enable task manager 602 to provide status update information for tasks that are owned by task manager 602. Specifically, window 700 can present task related information in a tabular format with one or more of the following columns: task identifier 702, project name 704, task description 706, status 708, remaining duration 710, and help needed 712.

The task identifier 702 column can include a unique identifier associated with a task. For example, as shown in FIG. 7, task manager 602 may own four tasks whose task identifiers are S1, S2, S3, and J1. The project name 704 column can identify the project which includes this task. The task description 706 column can contain a string that provides a brief description of the task. The status 708 column can specify the status of the task as inputted by the task manager. The remaining duration 710 column can specify the remaining time to complete as provided by the task manager. The help needed 712 column can specify the help that the task manager needs to resolve a delay in the task.

In some embodiments, each item in the status 708 column can present the user with a drop-down list for the different types of status that a task can have. In some embodiments, the task status can be one of the following: not started (NS), in progress (IP), and completed (CO). At regular intervals (e.g., on a daily basis), a task manager may use window 700 to update the progress of one or more tasks owned by the task manager. Window 700 has been presented for illustration purposes only and is not intended to limit embodiments of the present invention to the forms disclosed.

FIG. 8 illustrates a window in a GUI for inputting the help need to resolve the task delay in accordance with an embodiment of the present invention.

When a task is delayed, the system may present window 800 to the task manager so that the task manager can specify the help needed to resolve the delay. If the task manager inputs a help needed entry, it can be displayed in the help needed column 712 in window 700. If a task is progressing without any delays, the task may not have any help needed entry. For example, as shown in window 700, task S2 does not have any help needed entry.

Note that the help needed input can be hierarchically structured and be associated with one or more help needed attributes. For example, the system can allow the user to specify the type of help needed (e.g., personnel, equipment, etc.), and also allow the user to specify further details of the help needed (e.g., C++ programmer, computer monitor, etc.).

Figure 9:
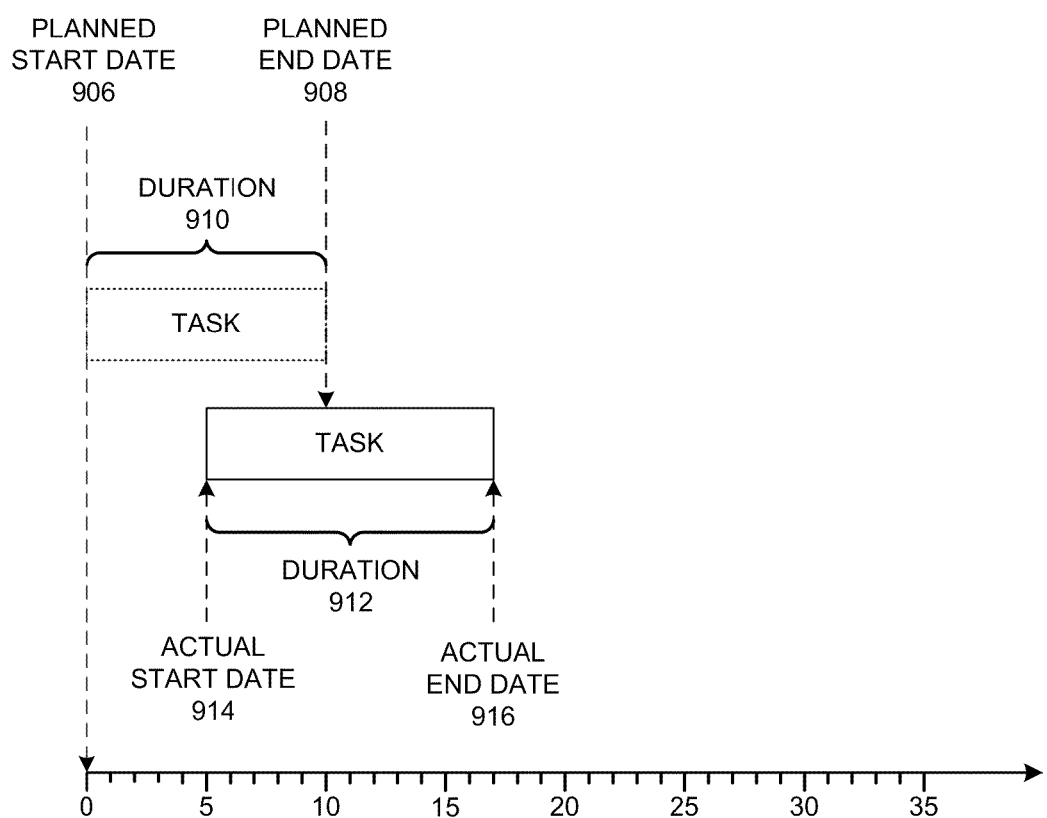
FIG. 9 illustrates how delays can be computed based on the status update in accordance with an embodiment of the present invention.

FIG. 9 illustrates how delays can be computed based on the status update in accordance with an embodiment of the present invention.

A task may be scheduled to start on planned start date 906 and finish on planned end date 908. However, the task may start on actual start date 914 and may end on actual end date 916. The start delays and the end delays for this task can be computed as follows. The difference between the planned start date 906 and the actual start date 914 is the start delay, which in this case is 5 days. Note that the project was initially planned to execute for duration 910, which is 10 days. However, the task actually executed for duration 912, which is 12 days. The execution delay is equal to the difference between durations 910 and 912, i.e., 2 days. In some embodiments, the system reports the actual execution duration (i.e., duration 912) and the start delay. Note that the actual execution duration can be less than, equal to, or greater than the planned execution duration.

FIG. 10 illustrates how the status update information can be used to compute delays and to associate the computed delays with different help needed items in accordance with an embodiment of the present invention.

Table 1000 illustrates how the values of the different fields change over time for the task shown in FIG. 9. The "DAY" column shows the progression of time in days. The "STATUS," "REMAINING DURATION," and "HELP NEEDED" columns show the values that the task manager provided for these fields each day.

Recall that the task shown in FIG. 9 was supposed to begin on day 0 and execute for 10 days. On day 0, when the task manager inputs the code "NS" (not started) as the status, the system can prompt the task manager to specify a help needed to resolve the start delay for the task. In response to this query, the task manager can indicate that the task's start date has been delayed because a resource is not available. Specifically, the task manager indicated that resource R1 was not available. (In terms of the "help needed" terminology, the task manager would indicate that to resolve the start delay for the task, the task manager needed resource R1 to become available.)

The status of the project remains "NS" until day 5 when the task manager updates the status to "IP" (in progress). Since the task is expected to take 10 days to complete, the task manager can indicate that the remaining duration is equal to 10. At this point, the system knows that the actual start date was day 5 instead of day 0, and can use this information to compute the start delay. Note that the task manager indicated that the start delay was due to the unavailability of two different resources. Specifically, out of the 5 days of the start delay, 2 days of the delay were due to resource R1, and the remaining 3 days of the delay were due to resource R2.

On day 8, the task manager indicates that the remaining duration has not changed from the previous day. Hence, the system may prompt the task manager to indicate the help needed to resolve the issue. As shown in FIG. 10, the task manager indicates that the task is being held up due to a maintenance issue, e.g., a machine that is required to perform the task is undergoing maintenance. On day 9, the task manager indicates that the remaining duration has decreased to 7 days, but the maintenance issue has not been resolved. On day 10, the task manager indicates that the maintenance issue has been resolved and that the remaining duration has decreased to 6 days. At this point, the system can compute the amount of delay that was caused by the maintenance issue by determining the total amount of time that the help needed request was active, and subtracting the amount of progress made during this time. For example, the maintenance needed issue was active for 2 days (days 8 and 9), but the remaining duration decreased by 1 day (see the remaining duration entry for days 8 and 9). Hence, the amount of delay associated with the maintenance needed issue is equal to 1 day (2−1=1).

On day 11, the remaining duration suddenly decreased to 2 days. This may have occurred because additional resources may have become available. However, the very next day, the remaining duration went back up to 4 days. Note that the system may not prompt the user to specify a help needed at this point because the remaining duration on day 12 is consistent with normal progress of the task.

On day 13, the task manager indicated that there was no progress made (because the remaining duration did not decrease). Hence, the system can prompt the task manager to input the help needed to resolve the delay. As shown in the table, the task manager indicated that the execution delay occurred because resource R1 was not available. As explained above, the system can compute the delay that is attributable to the help needed. In this case, the execution delay of 1 day is attributable to resource R1.

Finally, the task completes on day 17 when the task manager changes the status of the task from "IP" to "CO" (completed). The system can then use the historical status update information shown in table 1000 to compute the different types of delays for the different types of help needed. Tables 1002 and 1004 summarize the delay computations by the type of delay (e.g., start delay, execution delay, etc.) and the type of help needed (e.g., resource, maintenance, etc.).

Specifically, as shown in tables 1002 and 1004, the system can determine the following delay values: (a) the total delay for the task was 7 days, (b) the total start delay was 5 days, (c) the total execution delay was 2 days, (d) the start delay associated with resource unavailability was 5 days (of which a 2 day delay was associated with resource R1 and a 3 day delay was associated with resource R2), (e) the execution delay associated with resource availability was 1 day which was entirely attributable to resource R1, (f) the start delay associated with maintenance was 0 days, and (g) the execution delay attributable to maintenance was 1 day.

Figure 11:
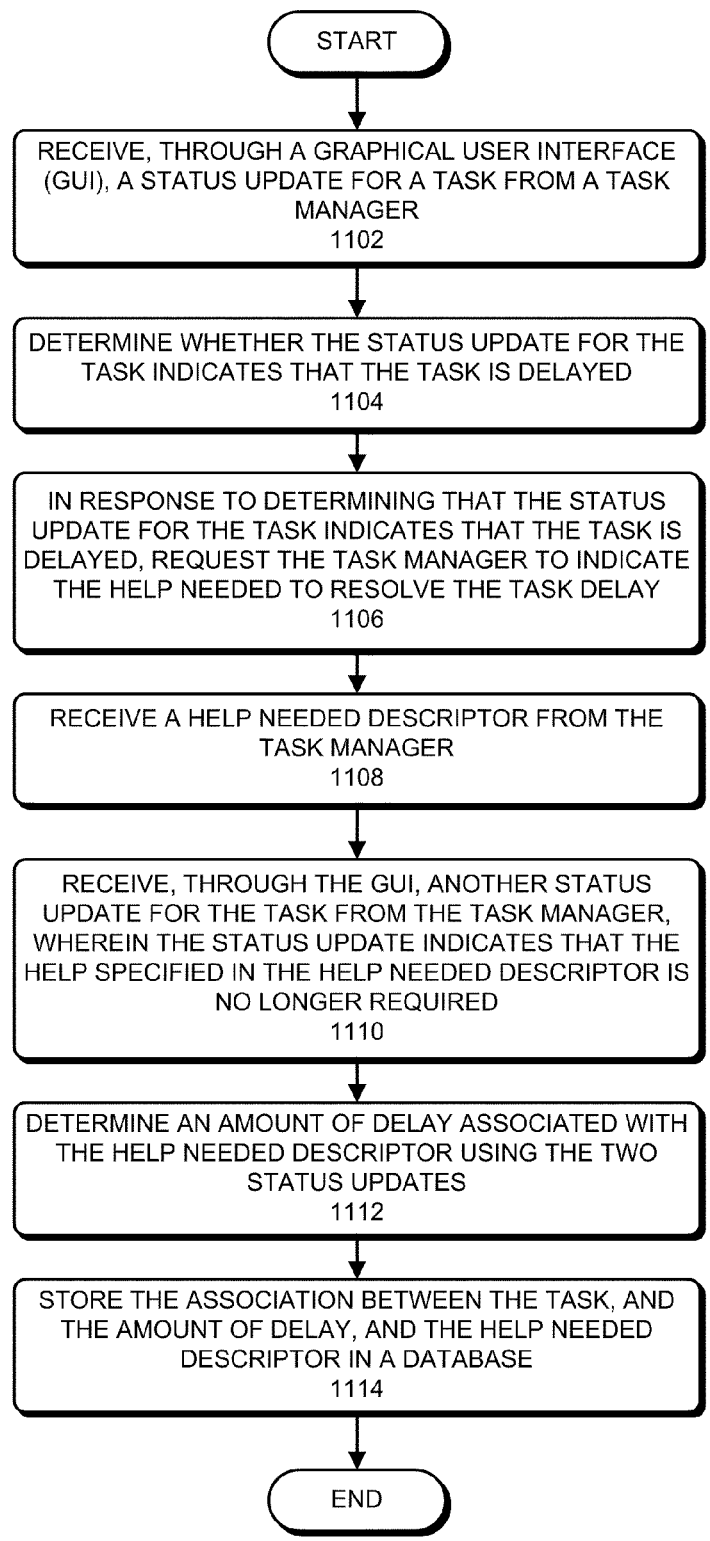
FIG. 11 illustrates a computer system in accordance with an embodiment of the present invention.

FIG. 11 presents a flowchart which illustrates a process for collecting status update information for tasks in accordance with an embodiment of the present invention.

The process can begin by receiving a status update for a task from a task manager through a GUI (block 1102). Next, the system can determine whether the status update for the task indicates that the task is delayed (block 1104). In response to determining that the task is delayed, the system can request the task manager to indicate the help needed to resolve the task delay (block 1106). Next, the system can receive a help needed descriptor for the task from the task manager (block 1108). Subsequently, the system can receive another status update for the task from the task manager, wherein the status update indicates that the help specified in the help needed descriptor is no longer required (block 1110). Next, the system can determine an amount of delay associated with the help needed descriptor using the two status updates (block 1112). The system can then store the association between the task, the amount of delay, and the help needed descriptor in a database (block 1114). The status information collected using these systems and techniques can then be used for identifying and prioritizing causes for buffer consumption.

Figure 12:
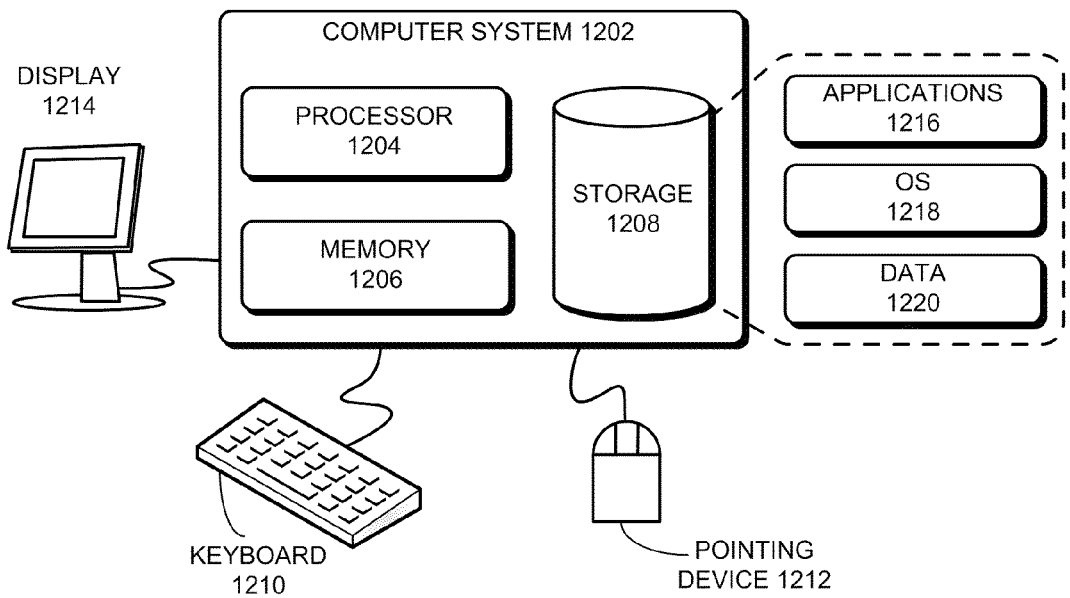
FIG. 12 illustrates an apparatus in accordance with an embodiment of the present invention.

FIG. 12 illustrates a computer system in accordance with an embodiment of the present invention.

A computer system can generally be any system that can perform computations. Specifically, a computer system can be a microprocessor, a network processor, a portable computing device, a personal organizer, a device controller, or a computational engine within an appliance, or any other computing system now known or later developed. Computer system 1202 comprises processor 1204, memory 1206, and storage 1208. Computer system 1202 can be coupled with display 1214, keyboard 1210, and pointing device 1212. Storage 1208 can generally be any device that can store data. Specifically, a storage device can be a magnetic, an optical, or a magneto-optical storage device, or it can be based on flash memory and/or battery-backed up memory. Storage 1208 can store application 1216, operating system 1218, and data 1220.

Application 1216 can include instructions that when executed by computer 1202 cause computer 1202 to perform one or more processes described in this disclosure. Data 1220 can include project names and start and end times, project buffer information, task names and start and end times, task attributes, task buffer information, task dependency information, and/or any other information that may be required for determining a task attribute's impact on project buffer consumption.

Figure 13:
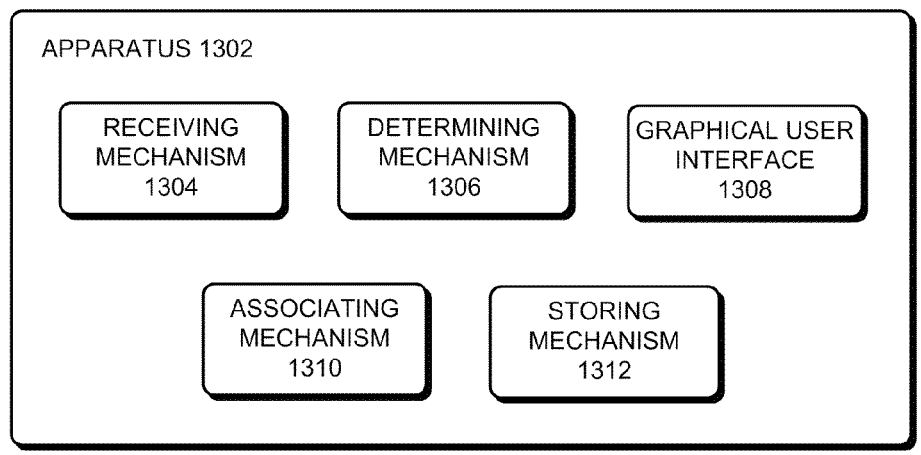
FIG. 13 illustrates an apparatus in accordance with the disclosed embodiments.

FIG. 13 illustrates an apparatus in accordance with an embodiment of the present invention.

Apparatus 1302 can comprise a number of mechanisms which may communicate with one another via a wired or wireless communication channel. Apparatus 1302 may be realized using one or more integrated circuits. Apparatus 1302 may be integrated with a computer system, or it may be realized as a separate device which is capable of communicating with other computer systems and/or devices. Specifically, apparatus 1302 can comprise receiving mechanism 1304, determining mechanism 1306, graphical user interface 1308, associating mechanism 1310, and storing mechanism 1312.

In some embodiments, receiving mechanism 1304 can be configured to receive information. Determining mechanism 1306 may be configured to determine whether a task has been delayed. Graphical user interface 1308 may be configured to present information to a user and to receive input from the user. Associating mechanism 1310 may be configured to associate delay values, tasks, and task attribute values. Storing mechanism 1312 may be configured to store information.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for associating a delay with a help needed descriptor, the method comprising:

receiving a first status update and a first remaining duration value for a task from a task manager, wherein the first status update indicates that the task is delayed;

receiving a help needed descriptor for the task from the task manager, wherein the help needed descriptor specifies the help needed to resolve the task delay;

receiving a second status update and a second remaining duration value for the task from the task manager, wherein the second status update indicates that the help specified in the help needed descriptor is no longer required;

determining an amount of delay associated with the help needed descriptor based on a time duration between receiving the first status update and receiving the second status update and a difference between the first remaining duration value and the second remaining duration value; and storing, in a database, the association between the help needed descriptor and the amount of delay.

2. The method of claim 1, further comprising requesting the task manager to indicate the help needed to resolve the task delay by presenting a questionnaire to the task manager which includes hierarchical help needed options.

3. The method of claim 1, wherein prior to receiving the first update for the task, the method further comprises presenting the task's current status to the task manager.

4. The method of claim 1, wherein the first status update for the task indicates that the task is delayed if the first remaining duration value is not consistent with the task's planned execution time.

5. A non-transitory computer-readable storage medium storing instructions that when executed by a computer cause the computer to perform a method for associating a delay with a help needed descriptor, the method comprising:

receiving a first status update and a first remaining duration value for a task from a task manager, wherein the first status update indicates that the task is delayed;

receiving a help needed descriptor for the task from the task manager, wherein the help needed descriptor specifies the help needed to resolve the task delay;

receiving a second status update and a second remaining duration value for the task from the task manager, wherein the second status update indicates that the help specified in the help needed descriptor is no longer required;

determining an amount of delay associated with the help needed descriptor based on a time duration between receiving the first status update and receiving the second status update and a difference between the first remaining duration value and the second remaining duration value; and storing, in a database, the association between the help needed descriptor and the amount of delay.

6. The non-transitory computer-readable storage medium of claim 5, further comprising requesting the task manager to indicate the help needed to resolve the task delay by presenting a questionnaire to the task manager which includes hierarchical help needed options.

7. The non-transitory computer-readable storage medium of claim 5, wherein prior to receiving the first update for the task, the method further comprises presenting the task's current status to the task manager.

8. The non-transitory computer-readable storage medium of claim 5, wherein the first status update for the task indicates that the task is delayed if the first remaining duration value is not consistent with the task's planned execution time.

9. A computer system for associating a delay with a help needed descriptor, comprising:
- a processor; and
- a memory coupled with the processor, wherein the memory stores instructions comprising:
    - instructions for receiving a first status update and a first remaining duration value for a task from a task manager, wherein the first status update indicates that the task is delayed;
    - instructions for receiving a help needed descriptor for the task from the task manager, wherein the help needed descriptor specifies the help needed to resolve the task delay;
    - instructions for receiving a second status update and a second remaining duration value for the task from the task manager, wherein the second status update indicates that the help specified in the help needed descriptor is no longer required;
    - instructions for determining an amount of delay associated with the help needed descriptor based on a time duration between receiving the first status update and receiving the second status update and a difference between the first remaining duration value and the second remaining duration value; and
    - instructions for storing, in a database, the association between the help needed descriptor and the amount of delay.

10. The computer system of claim 9, wherein the instructions further comprise instructions for requesting the task manager to indicate the help needed to resolve the task delay by presenting a questionnaire to the task manager which includes hierarchical help needed options.

11. The computer system of claim 9, wherein the instructions further comprise instructions for presenting the task's current status to the task manager.

12. The computer system of claim 9, wherein the first status update for the task indicates that the task is delayed if the first remaining duration value is not consistent with the task's planned execution time.

\* \* \* \* \*